United States Patent [19]
Liau

(10) Patent No.: US 6,377,446 B1
(45) Date of Patent: Apr. 23, 2002

(54) DETACHABLE COMPUTER MAINFRAME AND PERIPHERAL RACK MOUNTING ARRANGEMENT

(75) Inventor: Jian Ying Liau, Taoyuan Hsien (TW)

(73) Assignee: Enlight Corporation, Taoyuan Hsien (TW)

( * ) Notice: Subject to any disclaimer, the term of this patent is extended or adjusted under 35 U.S.C. 154(b) by 0 days.

(21) Appl. No.: 09/658,589

(22) Filed: Sep. 8, 2000

(51) Int. Cl.⁷ .................................................. G06F 1/16
(52) U.S. Cl. ........................ 361/683; 361/685; 361/726; 312/223.2; 364/708.1
(58) Field of Search ................................. 361/680, 683, 361/684, 685, 686, 724–727, 740; 312/223.1, 223.2, 298, 332.1, 333–334.13, 216, 218, 350, 330.1; 364/705.1, 708.1; 70/57–58, 85; 292/42, 148, 106, 151, 307 R; 248/551–553, 222.51, 680

(56) References Cited

U.S. PATENT DOCUMENTS 6,049,452 A * 4/2000 You et al. .................... 361/685

* cited by examiner

Primary Examiner—Leo P. Picard
Assistant Examiner—Michael Datskovsky
(74) Attorney, Agent, or Firm—Troxell Law Office PLLC

(57) ABSTRACT

A detachable computer mainframe and peripheral rack mounting arrangement includes a computer mainframe, and a peripheral rack detachably fastened to the top panel of the computer mainframe to hold a computer peripheral apparatus, the top panel of the computer mainframe having two parallel rows of locating holes bilaterally formed on a top panel thereof, the locating holes each having one end terminating in a reduced portion, the peripheral rack having a plurality of bottom retainers adapted for inserting into the locating holes of the top panel of the computer mainframe and engaging into reduced portion of each locating hole upon forward movement of the peripheral rack on the top panel of the computer mainframe and after insertion of the bottom retainers into the locating holes of the top panel of the computer mainframe.

3 Claims, 7 Drawing Sheets

DETACHABLE COMPUTER MAINFRAME AND PERIPHERAL RACK MOUNTING ARRANGEMENT

BACKGROUND OF THE INVENTION

The present invention relates to a computer mainframe and peripheral rack mounting arrangement, and more specifically to such a computer mainframe and peripheral rack mounting arrangement in which the peripheral rack can quickly and detachably fastened to the top panel of the computer mainframe to hold a computer peripheral apparatus, for example, a CD-ROM player.

A regular computer mainframe generally comprises an AC adapter, a mainboard, a CPU, disk drives, a CD-ROM or DVD player, and etc. These computer parts and peripheral apparatus are fixedly mounted inside the computer mainframe. According to this design, it is difficult to remove the computer parts and peripheral apparatus from the computer mainframe for a replacement. When the internal frame structure of a computer mainframe is fixed subject to the computer parts and peripheral apparatus to be installed, it cannot fit different models of computer peripheral apparatus.

SUMMARY OF THE INVENTION

The invention has been accomplished under the circumstances in view. According to the present invention, a peripheral rack is detachably mounted on the top panel of the computer mainframe to hold a CD-ROM player. The top panel of the computer mainframe has two rows of locating holes for the positioning of the peripheral rack. The peripheral rack has bottom retainers adapted for fastening to the locating holes of the top panel of the computer mainframe. The peripheral rack is practical for holding any of a variety of models of CD-ROM players.

DETAILED DESCRIPTION OF THE PREFERRED EMBODIMENT

Figure 1:
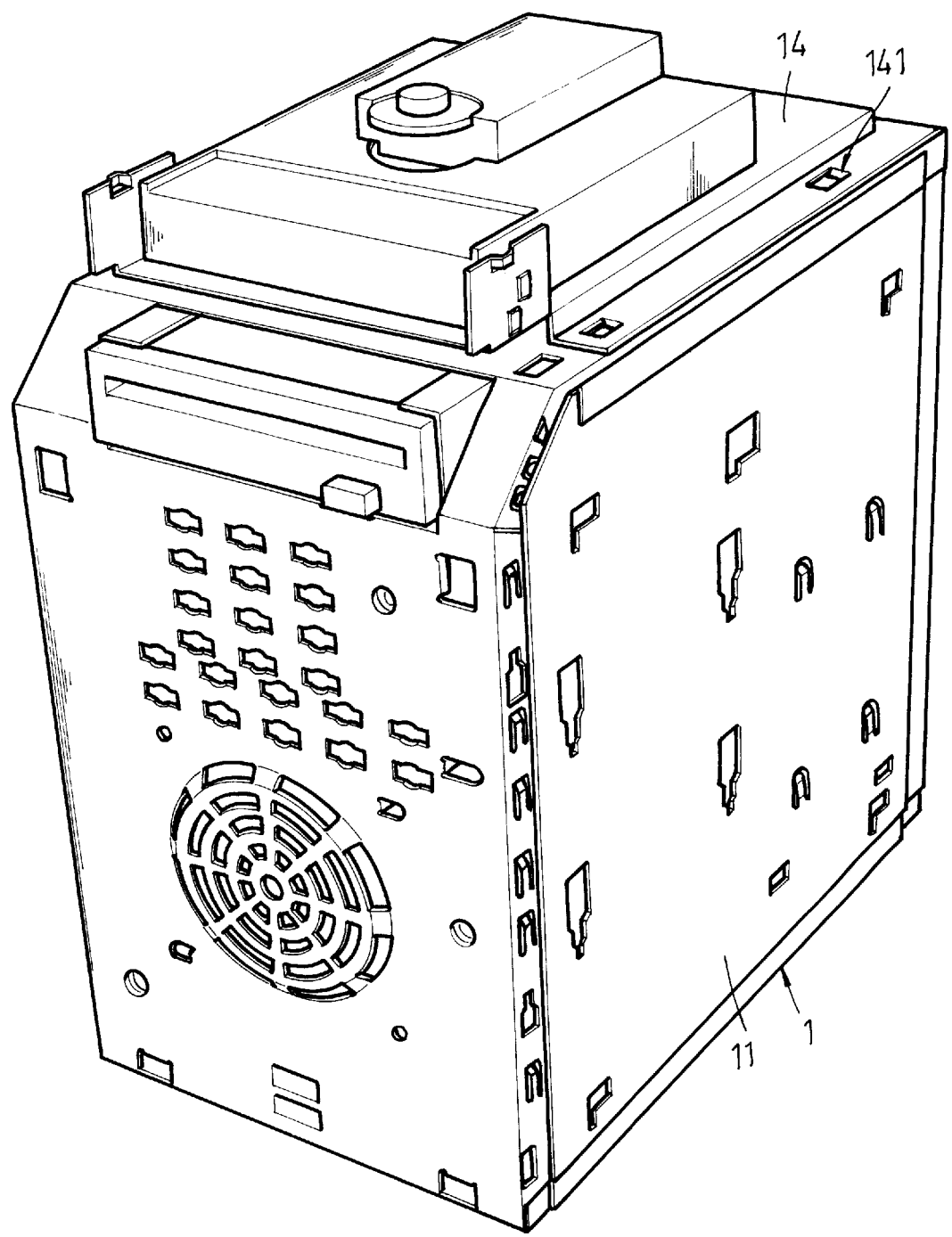
FIG. 1 is a perspective view of a first embodiment of the present invention.
Figure 2:
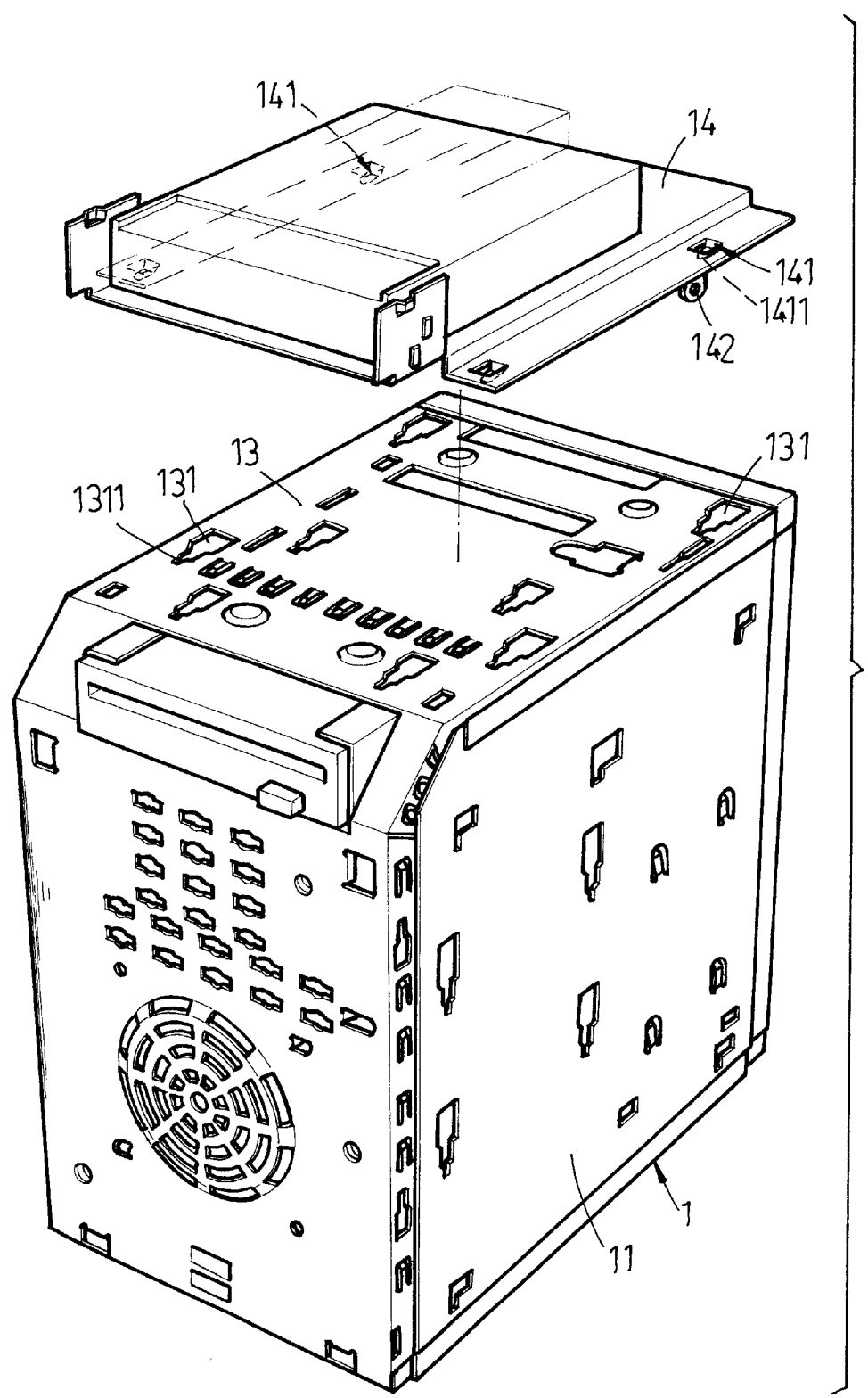
FIG. 2 is an exploded view of the first embodiment of the present invention.
Figure 3:
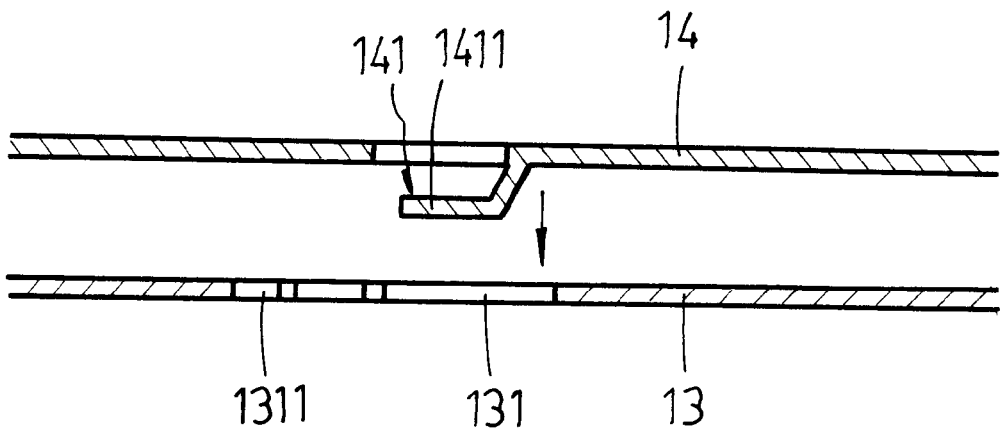
FIG. 3 is an enlarged view of a part of the first embodiment of the present invention showing the relationship between the rack and the top panel of the mainframe before engagement of the retainer means into the respective hook holes.
Figure 4:
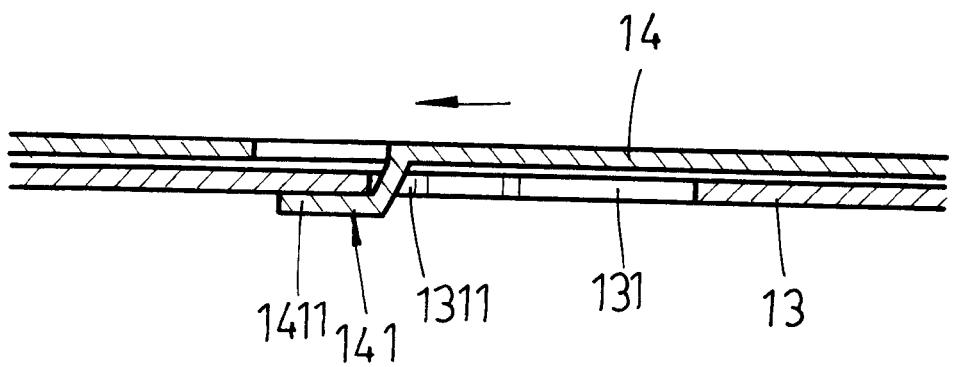
FIG. 4 shows the retainer means of the rack fastened to the hook holes of the top panel of the computer mainframe according to the first embodiment of the present invention.
Figure 5:
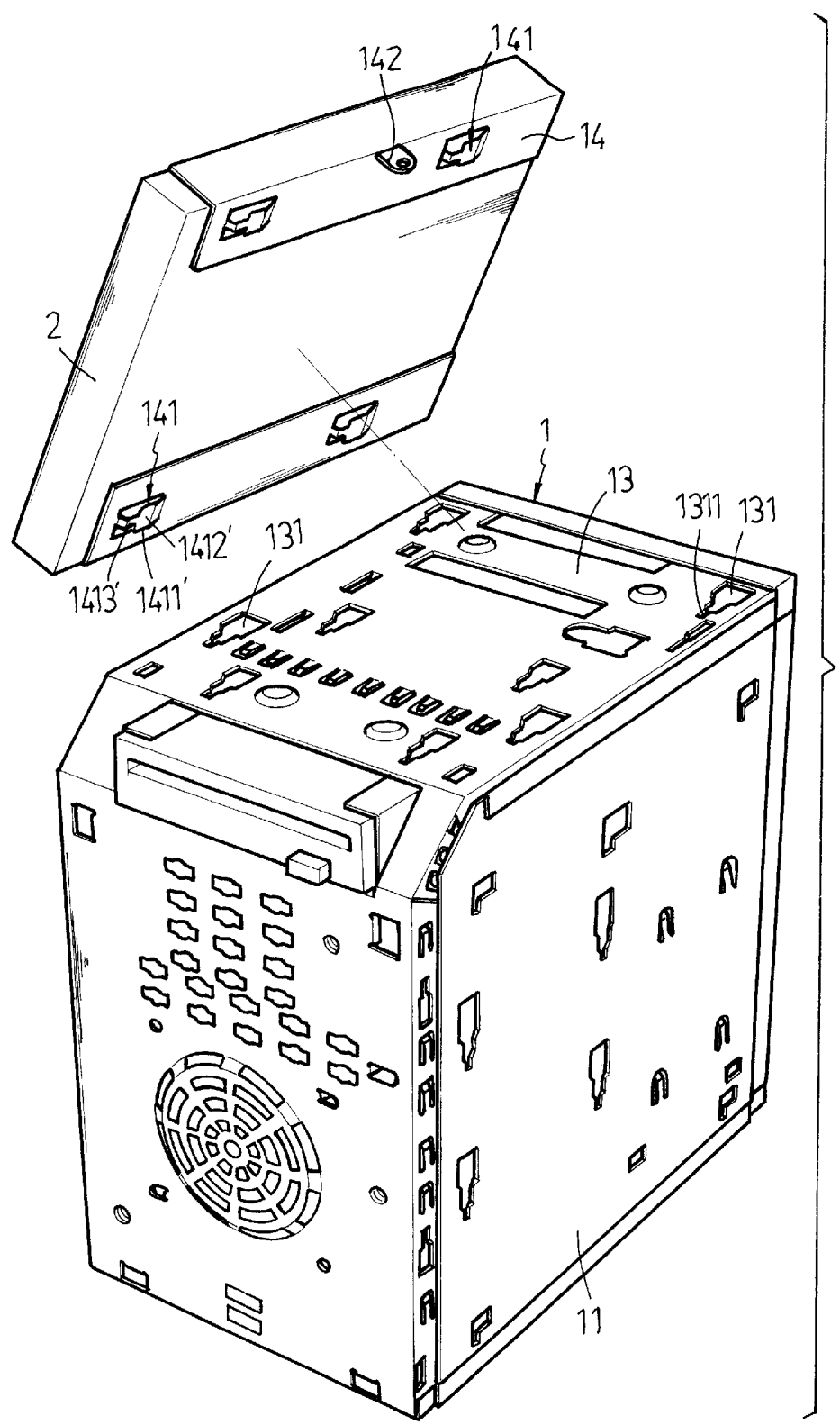
FIG. 5 is an exploded view of a second embodiment of the present invention.
Figure 6:
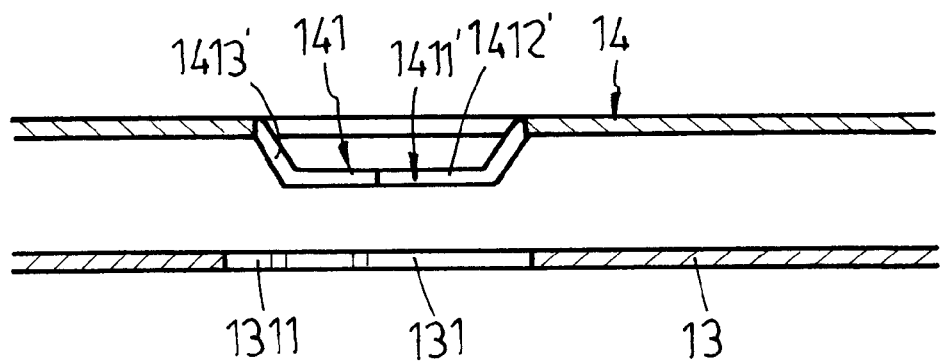
FIG. 6 is an enlarged view of a part of the second embodiment of the present invention showing the relationship between the rack and the top panel of the mainframe before engagement of the retainer means into the respective hook holes.
Figure 7:
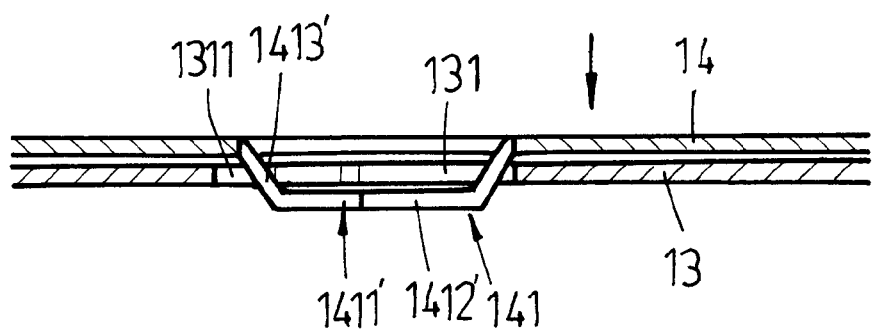
FIG. 7 illustrates the strip body of the protruded strip of the rack inserted into the corresponding hook hole of the top panel of the computer mainframe according to the second embodiment of the present invention.
Figure 8:
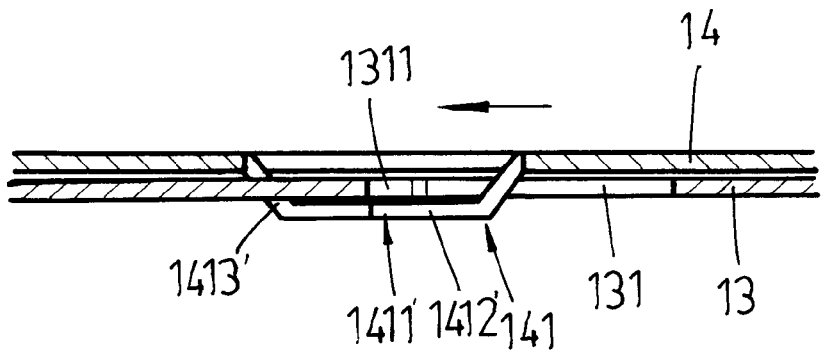
FIG. 8 is similar to FIG. 7 but showing the rack pushed forwards, the engagement portion of the protruded strip engaged into the reduced portion of the corresponding hook hole.
Figure 9:
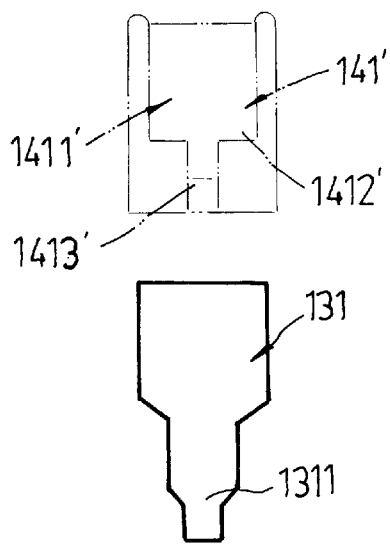
FIG. 9 is a plain view showing the relationship between the protruded strip and the hook hole according to the second embodiment of the present invention.
Figure 10:
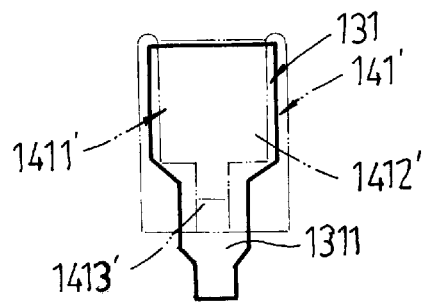
FIG. 10 shows the protruded strip inserted into the hook hole according to the second embodiment of the present invention.
Figure 11:
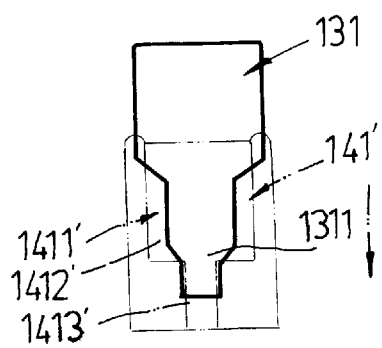
FIG. 11 is similar to FIG. 10 but showing the protruded strip forced forwards, the engagement portion of the protruded strip engaged into the reduced portion of the hook hole.
Figure 12:
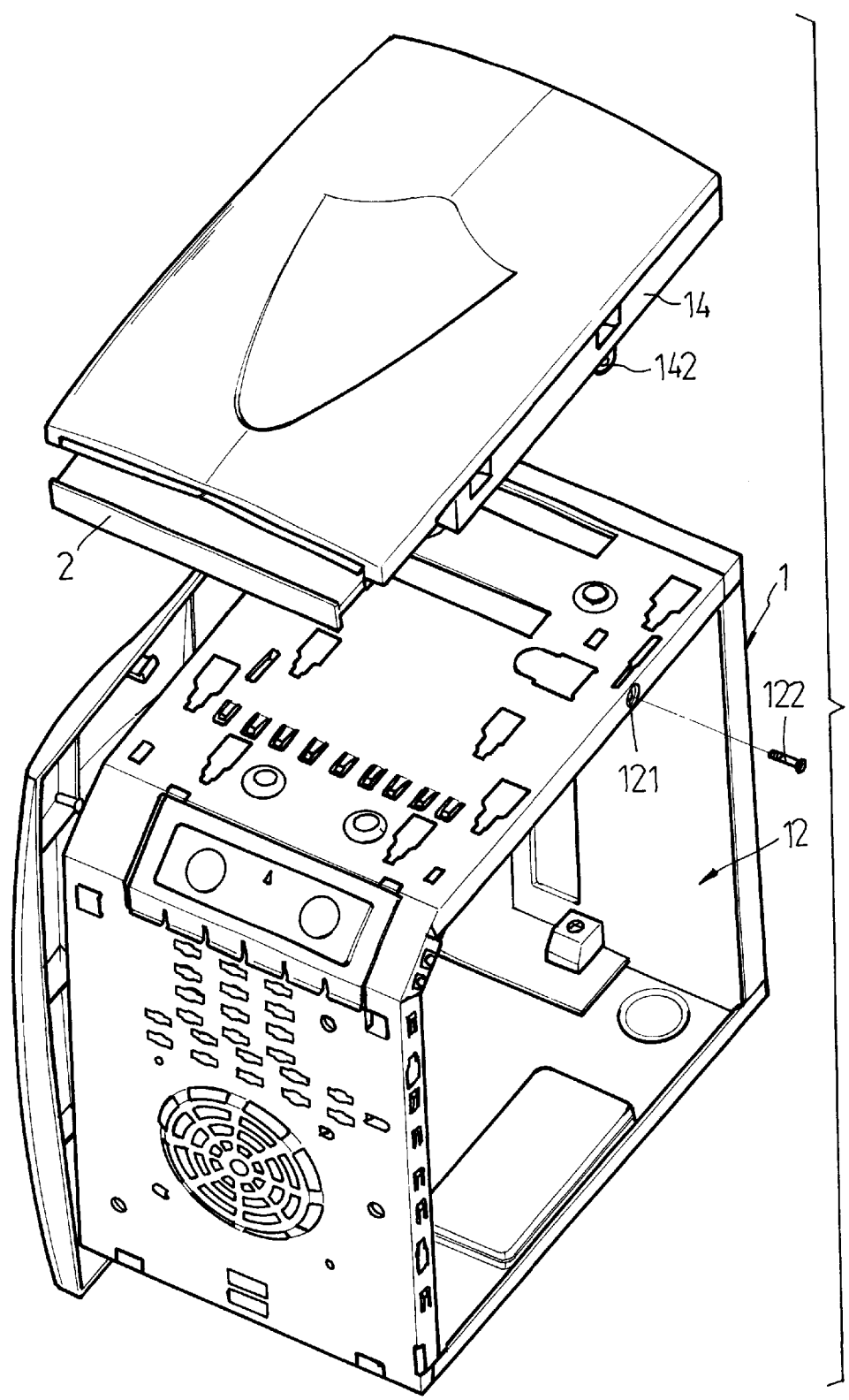
FIG. 12 is an exploded view of a third embodiment of the present invention.

Referring to FIGS. 1, 5 and 12, the computer mainframe, referenced by 1, has a top panel 13 adapted to hold a rack 14 and any of a variety of CD-ROM players 2 in the rack 14. The top panel 13 comprises two rows of locating holes 131. The locating holes 131 each have a reduced portion 1311 disposed at one end and extended in same direction. The CD-ROM player 2 can be of any of a variety types. For example, the top-lifting type shown in FIG. 1, the standard type shown in FIG. 5, or the ultra-thin type shown in FIG. 12.

Referring to FIGS. from 2 through 4 and FIG. 1 again, the rack 14 of this embodiment is adapted to hold a CD-ROM of the top-lift type. According to this embodiment, the rack 14 comprises a plurality of bottom retainer means 141 arranged in two longitudinal lines at the bottom side thereof corresponding to the locating holes 131 of the top panel 13 of the computer mainframe 1. According to this embodiment, the bottom retainer means 141 are L-shaped hooks 1411. When fastening the rack 14 to the top panel 13 of the computer mainframe 1, the L-shaped hooks 1411 of the rack 14 are respectively inserted into the locating holes 131, and then the rack 14 is pushed forwards to force the L-shaped hooks 1411 into engagement with the reduced portion 1311 of each locating hole 131.

Referring to FIGS. from 6 through 11 and FIG. 5 again, the bottom retainer means 141 are protruded strips 1411' each comprising a strip body 1412' spaced from the bottom side wall of the rack 14, and an engagement portion 1413' connected between the bottom side wall of the rack 14 and the strip body 1412'. When fastening the rack 14 to the top panel 13 of the computer mainframe 1, the protruded strips 1411' of the rack 14 are respectively inserted into the locating holes 131, and then the rack 14 is pushed forwards to force the engagement portion 1413' into engagement with the reduced portion 1311 of each locating hole 131. The rack 14 of this alternate form is adapted to hold a standard type CD-ROM player.

Referring to FIG. 12 and FIGS. 1 and 5 again, the mainframe 1 comprises a side chamber 12, and a mounting hole 121 at the topside of the side chamber 12. The rack 14 has a bottom lug 142 disposed at one side. After engagement of the bottom retainer means 141 into the locating holes 131, a fastening element 122 is installed in the mounting hole 121 to secure the lug 142 of the rack 14 to the computer mainframe 1, and then a cover panel 11 is fastened to the computer mainframe 1 to close the side chamber 12.

It is to be understood that the drawings are designed for purposes of illustration only, and are not intended for use as a definition of the limits and scope of the invention disclosed.

What the invention claimed is:

1. A detachable computer mainframe and peripheral rack mounting arrangement comprising a computer mainframe, said computer mainframe having two parallel rows of locating holes bilaterally formed on a top panel thereof, said locating holes each having one end terminating in a reduced portion, and a peripheral rack fastened to the top panel of said computer mainframe and adapted to hold a computer peripheral apparatus, said peripheral rack comprising a plurality of bottom retainers adapted for inserting into the locating holes of said top panel of said computer mainframe and engaging into the reduced portion of each of said locating holes after said bottom retainers being inserted respectively into the locating holes of said top panel of said computer mainframe and said peripheral rack being pushed forwards relative to the top panel of said computer mainframe.

2. The detachable computer mainframe and peripheral rack mounting arrangement of claim 1 wherein said bottom retainers of said peripheral rack are L-shaped hooks.

3. The detachable computer mainframe and peripheral rack mounting arrangement of claim 1 wherein said bottom retainers are protruded strips each comprising a strip body spaced from a bottom side wall of said peripheral rack and adapted for inserting into one locating hole of the top panel of said computer mainframe, and an engagement portion connected between said peripheral rack and said strip body and adapted for engaging into the reduced portion of one locating hole.

* * * * *